(12) United States Patent
Wagener

(10) Patent No.: US 9,019,612 B2
(45) Date of Patent: Apr. 28, 2015

(54) WSS USING MULTIPLE TECHNOLOGY SWITCHING ELEMENTS

(71) Applicant: Nistica, Inc., Bridgewater, NJ (US)

(72) Inventor: Jefferson Wagener, Morristown, NJ (US)

(73) Assignee: Nistica, Inc., Bridgewater, NJ (US)

( * ) Notice: Subject to any disclaimer, the term of this patent is extended or adjusted under 35 U.S.C. 154(b) by 0 days.

(21) Appl. No.: 14/089,177

(22) Filed: Nov. 25, 2013

(65) Prior Publication Data

US 2014/0146395 A1    May 29, 2014

Related U.S. Application Data

(60) Provisional application No. 61/729,615, filed on Nov. 25, 2012.

(51) Int. Cl.
*G02B 27/10*    (2006.01)
*G02B 5/18*    (2006.01)
*G02B 6/26*    (2006.01)
*G02B 27/46*    (2006.01)

(52) U.S. Cl.
CPC ............ *G02B 27/1006* (2013.01); *G02B 27/10* (2013.01); *G02B 5/18* (2013.01); *G02B 27/46* (2013.01); *G02B 6/264* (2013.01)

(58) Field of Classification Search
CPC .... G02B 27/10; G02B 27/1006; G02B 27/46; G02B 5/18; G02B 6/26; G02B 6/264
USPC ................ 359/290–295, 279, 615, 618, 634, 359/485.01–485.05, 489.01, 489.06, 359/489.15, 399, 558, 563; 385/16–18, 24, 385/47; 356/326, 477
See application file for complete search history.

(56) References Cited

U.S. PATENT DOCUMENTS

| | | | |
|---|---|---|---|
| 6,430,328 B1 | 8/2002 | Culver et al. | |
| 6,956,687 B2 | 10/2005 | Moon et al. | |
| 7,092,599 B2 | 8/2006 | Frisken | |
| 7,123,833 B2 | 10/2006 | Szczepanek et al. | |
| 7,126,740 B2 | 10/2006 | Szczepanek et al. | |
| 7,397,980 B2 | 7/2008 | Frisken | |
| 7,612,930 B2 * | 11/2009 | Holmes | 359/279 |
| 7,664,395 B2 * | 2/2010 | Holmes | 398/49 |
| 7,702,194 B2 * | 4/2010 | Presley et al. | 385/18 |
| 7,769,255 B2 * | 8/2010 | Nagy et al. | 385/18 |
| 7,873,246 B2 * | 1/2011 | Nagy et al. | 385/18 |
| 8,000,568 B2 * | 8/2011 | Presley et al. | 385/18 |
| 8,089,683 B2 * | 1/2012 | Holmes | 359/279 |
| 8,131,123 B2 * | 3/2012 | Presley et al. | 385/18 |
| 8,335,033 B2 * | 12/2012 | Holmes | 359/279 |
| 8,503,836 B2 * | 8/2013 | Ishikawa et al. | 385/17 |
| 2009/0028501 A1 | 1/2009 | Wagener et al. | |
| 2011/0033151 A1 | 2/2011 | Cohen et al. | |
| 2012/0236216 A1 | 9/2012 | Sharma et al. | |
| 2012/0237218 A1 | 9/2012 | Yang et al. | |
| 2012/0275744 A1 | 11/2012 | Yang et al. | |

* cited by examiner

*Primary Examiner* — Loha Ben
(74) *Attorney, Agent, or Firm* — Stuart H. Mayer; Mayer & Williams PC

(57) ABSTRACT

A wavelength selective switch for selectively switching optical wavelength components of an optical signal uses both LCoS and MEMs switching technologies to improve device performance. Specific performance improvements may include more ports, better spectral performance and isolation, improved dynamic crosstalk, more flexible attenuation options, integrated channel monitoring and compressed switch heights.

3 Claims, 1 Drawing Sheet

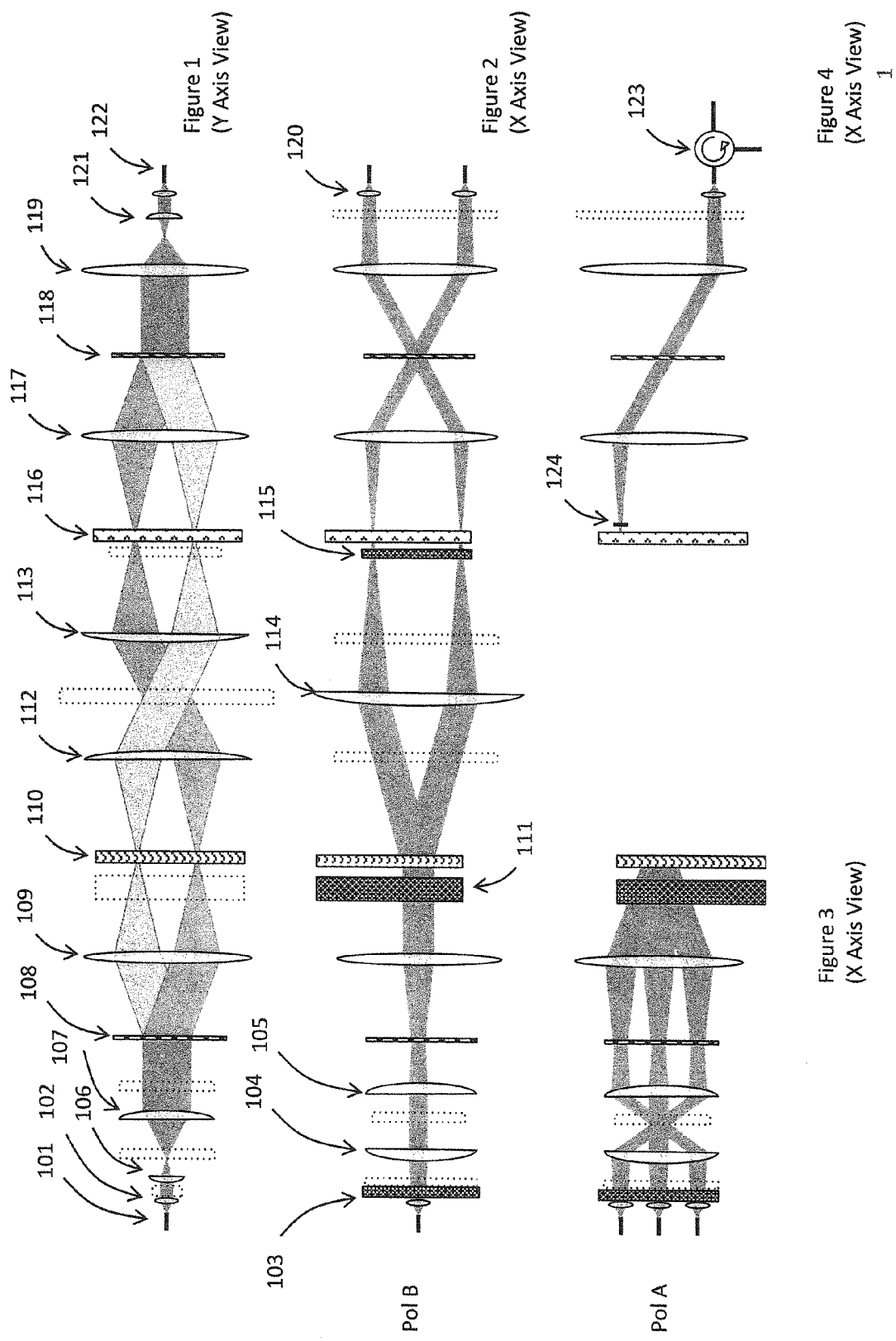

WSS USING MULTIPLE TECHNOLOGY SWITCHING ELEMENTS

BACKGROUND

Optical networks use Wavelength Selective Switches (WSS) to dynamically route optical wavelength signals from a source to a destination. WSS devices often rely on wavelength manipulation elements such as liquid crystal on silicon (LCoS) devices or micro-electromechanical (MEMS) mirror arrays to perform the routing.

LCoS devices include a liquid crystal material sandwiched between a transparent glass layer having a transparent electrode, and a silicon substrate divided into a two-dimensional array of individually addressable pixels. Each pixel is individually drivable by a voltage signal to provide a local phase change to an optical signal, thereby providing a two-dimensional array of phase manipulating regions. Manipulation of individual spectral components is possible once an optical signal has been spatially separated by a diffractive element such as a diffraction grating. The spatial separation of spectral components is directed onto predetermined regions of the LCoS device, which can be independently manipulated by driving the corresponding pixels in a predetermined manner.

MEMs devices such as a Digital Micromirror Device (DMD) is comprised of a two-dimensional array of micromirrors or pixels, each actuatable in an ON state or an OFF state. As used herein in the context of a DMD, the terms "micromirror" and "pixel" are used inter-changeably. Typically, a DMD consists of an array of tiny mirrors (typically, several million per square inch), wherein the angular position of each mirror element is individually controllable between at least two positions that are angularly offset from one another by approximately 10 to 20 degrees, for instance. A mirror base is located behind the mirror elements. The individually addressable mirror elements are tiltably mounted on mechanical hinges, and typically the array of mirror elements overlays a layer of controlling circuitry in the mirror base, all of which is mounted on a semiconductor chip. The mirror face of the DMD is composed of a generally rectangular grid array of rectangular or square mirror elements. A typical mirror element is about 16 micrometers square, and the individual elements are separated from one another by a distance of about 1 micron. Individually controlled tilting of the mirror elements in the array around at least one axis allows energy that is reflected from the mirror face to be formed into a predetermined pattern. Further, the mirror face can be substantially instantaneously reconfigured in response to digital signals to form a different pattern. Such reconfiguration is accurate and reproducible, and can generally be achieved in about 25 microseconds or less.

Wavelength selective switches are generally made with either LCoS or MEMs switching technologies. This may limit the performance range of any given switch.

SUMMARY

By combining LCoS and MEMs switching technologies, device performance can be improved. Specific performance improvements may include, but are not limited to, more ports, better spectral performance and isolation, improved dynamic crosstalk, more flexible attenuation options, integrated channel monitoring and compressed switch heights.

In accordance with one aspect of the invention, a phase spatial light modulator (e.g., LCoS) is used to efficiently direct light to a desired port, followed by the use of waveblocker architecture (e.g., a DMD) to create the desired isolation between ports.

In accordance with another aspect of the invention, polarization multiplexing may be used to save space within a WSS to make two devices that substantially overlap.

In accordance with another aspect of the invention, only 1 switching element may be used in a dual element device for an alternatively performing WSS.

In accordance with another aspect of the invention, only 1 switching element may be used in a dual element device for a spectral analyzer function (OCM).

In accordance with another aspect of the invention, imaging may be accomplished without use of a dispersive element between the two switching elements.

In accordance with another aspect of the invention, a relay telescope may be used in single axis prior to dispersion for reduced optical height.

In accordance with another aspect of the invention, a relay telescope may be used with a specific magnification to appropriately fill the physical width occupied by different switching devices.

BRIEF DESCRIPTION OF THE DRAWINGS

FIGS. 1 and 2 show a top view (along the y-axis) and a side view (along the x-axis), respectively, of one example of a wavelength selective switch.

FIG. 3 shows a side view of an optical beam in polarization state A propagating through the wavelength selective switch of FIGS. 1 and 2.

FIG. 4 shows a side view of an alternative embodiment of the wavelength selective switch which employs a waveblocker that can be used for channel routing or spectral monitoring.

DETAILED DESCRIPTION

The following is a description of one example of a switch using Liquid Crystal on Silicon (LCoS) and Digital Micromirror Device (DMD) technologies. All numerical values are presented for illustrative purposes only and not as a limitation on the subject matter being described.

FIGS. 1 and 2 show a top view (along the y-axis) and a side view (along the x-axis), respectively, of a wavelength selective switch. Spherical lenses which affect the beam in both axes are illustrated with solid lines as bi-convex optics in both views. Cylindrical lens which only affect the beam in one axis are illustrated with solid lines as plano-convex lenses in the axis that is affected. The cylindrical lenses are also illustrated by dashed lines in the axis which they do not affect. For instance, in FIGS. 1 and 2 the spherical optical elements 102, 109, 117, 119 and 120 are depicted with solid lines in both figures. On the other hand, cylindrical optical elements 102, 106, 107, 112, 113 and 121 are only depicted with solid lines in FIG. 1 (since they all have focusing power along the y-axis) and only with dashed lines in FIG. 2 (since they all leave the beams unaffected in the x-axis). Cylindrical optical elements 104, 105 and 114 are only depicted with solid lines in FIG. 2 (since they all have focusing power along the x-axis) and only with dashed lines in FIG. 1 (since they all leave the beams unaffected in the y-axis). Likewise, birefringent crystals 103, 111 and 115 only walkoff the beams along the x-axis and thus are illustrated with solid lines in FIG. 2 and dashed lines in FIG. 1.

Using an input array of multiple fibers arrayed in the x direction (101) the light can be first collimated with a lenslet array (102) with a beam width of 150 microns. The spacing between beams may be 500 microns. Subsequently the polarizations of the light can be separated in the x direction with a birefringent crystal (103) acting as a polarization beam walk off crystal, thereby creating two beams from each fiber. Interleaved waveplates (not shown) with a 250 micron period are then used to align the polarization of all the beams to state A. However, one fiber uses waveplates opposite in phase, resulting in beams with a polarization orthogonal to all the beams from the other fibers. That is, this one fiber provides beams in a polarization state B, which is orthogonal to A.

Each beam then gets imaged thru a telescope. The telescope is created with different magnification factors for the x and y directions, resulting in a minimal magnification in the x direction formed by the 30 mm focal length cylinder lenses (104) and (105), while the magnification in the y direction is set by the 1.6 mm and 60 mm focal lengths of cylindrical lenses (106) and (107) respectively. These beams are all then diffracted by an optical grating (108) to create wavelength dispersion in the y axis. This grating is placed at the optical waist of the beams in the x-axis. More than 1 grating can be used to increase the dispersion. Focusing lens (109) is then used to create astigmatic beams on the LCoS element (110). Prior to the LCoS, a second beam walkoff crystal and waveplate (111) is used to separate the one fiber with polarization state B. FIG. 2 shows light in polarization state B and the optics through which it passes. Likewise, FIG. 3 shows light in polarization state A and the optics through which it passes. Of course, the figures show polarization states A and B in separate diagrams for clarity only. As shown in FIG. 3, state A polarization is then steered between 2 fibers via the LCoS (110). This forms a WSS switch with one switching element.

Referring to FIGS. 1 and 2, original polarization state B is also steered via the LCoS and directed towards imaging optics. This is shown in transmission in the figure for clarity purposes. Cylindrical lenses (112) and (113) form a telescope in the y-axis and image small spots from the LCoS (110) to the DMD (116). A different cylindrical lens (114) in the x-axis is used to separate and focus beams onto the DMD (116) in that axis. Prior to the DMD, a further waveplate array and beam walkoff crystal (115) is used to recombine the 2 polarizations of the original signal. The magnification factor of the telescope formed by lenses (112) and (113) is chosen to match the y axis fills of the LCoS and DMD devices. In this case, the focal lengths chosen are 63 mm and 58 mm for a de-magnification factor of 0.92. The focal length of the lens (114) is chosen as 125 mm.

While the DMD (116) is a reflective device, transmission is shown in the figure for the sake of clarity. The DMD acts as a pass/block filter on a per wavelength and port basis, or implemented as an amplitude spatial light modulator on a per pixel basis. Light passed is directed towards lens (117) with focal length 125 mm which acts as a collimator and angular multiplexer of all port and wavelengths. The angularly multiplexed beams are then imaged onto a wavelength dispersive element, grating (118). This grating can be the same or different than the grating (108). After wavelengths are re-multiplexed, the resultant beams are imaged thru lens (119) in both axes to be coupled into the respective fiber by lenslet array (120) with an astigmatic correction element (121) for the y-axis. A focal length of 63.5 mm allows for an fiber array (122) spacing of 127 microns. The lenslet (120) focal length is chosen to match the fiber parameters at 0.355 mm and the correcting lens (121) has a focal length 0.79 mm.

Additionally, further ports can be added to the fiber array (122) that are not used in conjunction with the LCoS (110). These ports are spatially separated from the other ports at and adjacent to the DMD (116). For instance, as shown in FIG. 4, a beam deflector (124) can be used to direct these ports back onto them selves after reflection from the DMD acting as a spatial light modulator. In conjunction with a circulator (123) this forms an individual waveblocker that can be used for channel routing or terminated into a detector for spectral monitoring.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

The invention claimed is:

1. A method for directing wavelength components of an optical beam from an input port of a port array to at least one output port of the port array, comprising:
   receiving a plurality of optical beams at a plurality of ports;
   arranging the plurality of optical beams received by the plurality of ports into a first polarization state;
   spatially separating each of the optical beams into first and second optical beams;
   magnifying each of the first and second optical beams with different magnification factors in each of two orthogonal directions defined by a first and second direction;
   spatially separating the wavelength components in each of the first and second optical beams in the second direction;
   directing the spatially separated wavelength components onto an LCoS element to create a plurality of astigmatic beams on the LCoS element; and
   using the LCoS element to selectively direct the astigmatic optical beams to selected ones of the ports.

2. The method of claim 1 wherein the plurality of ports extend in the first direction and the optical beams are spatially separated in the first direction.

3. The method of claim 2 wherein the magnification factor in the second direction is greater than the magnification in the first direction.

* * * * *